United States Patent [19]

Williamson et al.

[11] Patent Number: 4,461,445
[45] Date of Patent: Jul. 24, 1984

[54] MOUNTING DEVICES FOR DISPENSERS

[75] Inventors: Audley B. Williamson; Stewart Banks; Frances J. Rice, all of Milford, England

[73] Assignee: Appor Limited, Milford, England

[21] Appl. No.: 225,575

[22] Filed: Jan. 16, 1981

[51] Int. Cl.³ ............................................. F16M 13/00
[52] U.S. Cl. ...................................... 248/551; 222/181
[58] Field of Search ............ 248/551, 552, 553, 311.2; 222/180, 181; 70/451, 466, 164

[56] References Cited

U.S. PATENT DOCUMENTS

| | | | |
|---|---|---|---|
| 1,013,850 | 1/1912 | Volkmar | 248/553 X |
| 1,826,162 | 10/1931 | Balk | 248/553 X |
| 2,520,003 | 8/1950 | Gilmore | 222/181 X |
| 4,036,406 | 7/1977 | Jespersen | 222/181 |
| 4,161,265 | 7/1979 | Hauser | 222/181 |

Primary Examiner—J. Franklin Foss
Attorney, Agent, or Firm—Alan H. Levine

[57] ABSTRACT

A mounting and locking device for a dispenser consists of a mounting plate provided with holes enabling it to be screwed to a wall or similar support and having projections engageable with grooves formed in the back of the dispenser so that the dispenser can be engaged with the mounting plate by downward sliding movement. A latch member is provided on a portion of the mounting plate which is obscured by the dispenser when the dispenser is mounted on the mounting plate. The latch member is arranged in an operative position to project from the mounting plate and locate in a recess formed in the rear of the dispenser so that if an attempt is made to remove the dispenser by sliding it upwardly relative to the mounting plate the latch engages the dispenser and prevents it from being removed. The latch can be disengaged from the dispenser to enable the dispenser to be detached from the mounting bracket by means of a special tool inserted through a small opening in the underside of the bracket and engageable with a moving part of the latch. The opening is small so that the arrangement is largely tamper proof.

5 Claims, 18 Drawing Figures

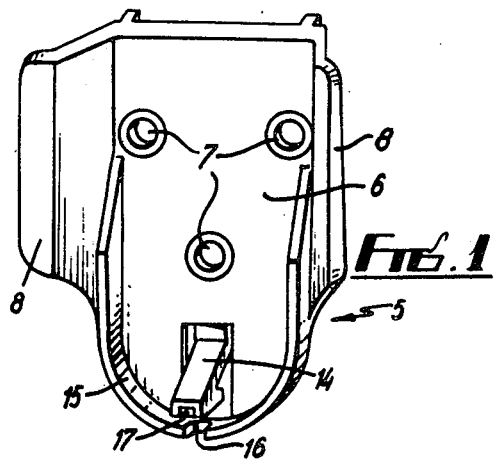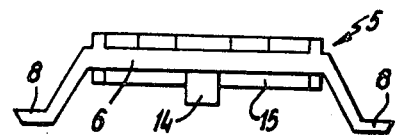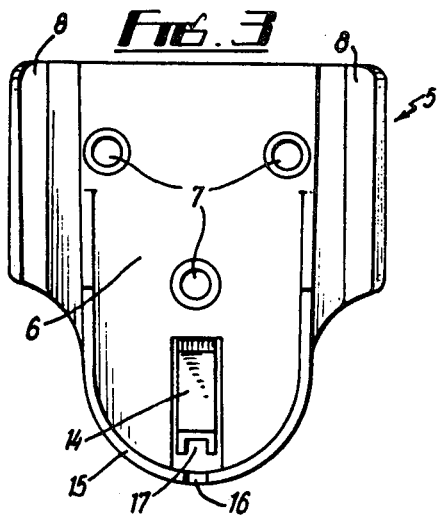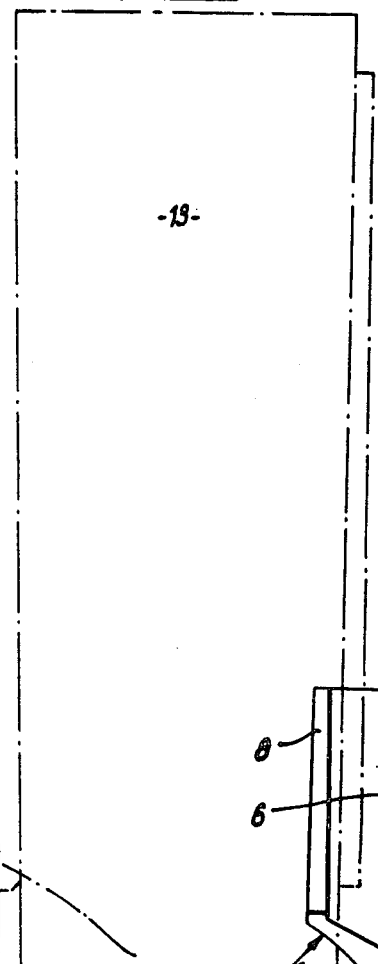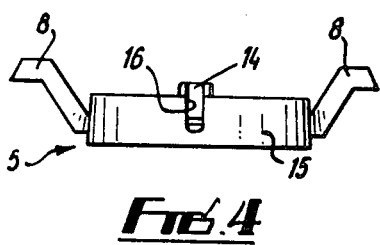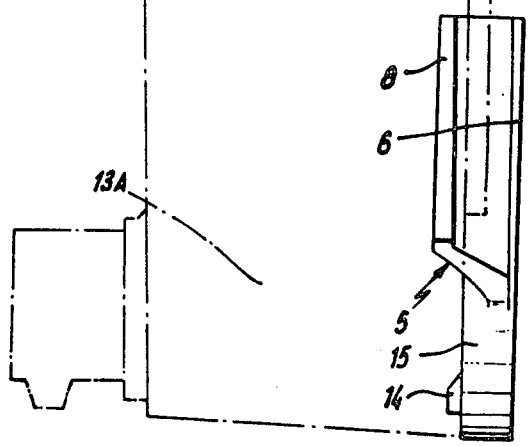

MOUNTING DEVICES FOR DISPENSERS

The invention relates to locking devices and is particularly applicable to tamper-proof locking devices for dispensing apparatus such as soap dispensers and the like.

Apparatus for dispensing liquid soap installed in toilets, washrooms and the like is subject to damage by vandals. Some means therefore requires to be provided not only to prevent interference with the dispenser or its contents but to prevent removal from the supporting structure on which it is mounted. It is an object of the present invention to provide a locking device which may be used to prevent removal of such a dispenser from its mounting.

The invention provides a mounting and locking device for a dispenser, comprising a mounting plate, means on the mounting plate for slidably receiving a dispenser so as to mount same on the mounting plate, and a latch member associated with a portion of the mounting plate which is obscured by the dispenser when the latter is mounted on the mounting plate, the latch member being adapted in an operative locking position to engage with a portion of the dispenser to prevent removal of the dispenser from the mounting plate.

In a preferred arrangement the latch member comprises a resilient projection carried by the mounting plate and resiliently biased into a locking position in which it projects beyond the mounting plate for engagement in a recess in the dispenser, the projection being resiliently deformable away from said locking position to a retracted release position in which it is disengaged from said recess and permits removal of the dispenser from the mounting plate.

In an alternative arrangement the latch member is a flexible member carried by a movable element which may be rotated relative to a fixed ramp carried by the mounting plate, engagement between the flexible member and the ramp causing the flexible member to deflect into a locking position in which it projects beyond the mounting plate for engagement in a recess in the dispenser.

Preferably an opening is provided in the periphery of the mounting plate to enable access to said latch member, the opening being of relatively small dimensions such that access may be gained only by use of a special tool.

The invention also provides a dispenser assembly comprising a mounting and locking device as aforesaid and a dispenser incorporating a container adapted to receive products to be dispensed, the dispenser being provided with formations in the rear wall thereof slidably engageable with complementary formations on the mounting plate to locate the dispenser thereon in a manner such that the mounting plate is obscured by the dispenser, an opening being provided in the dispenser adjacent to said latch member for engagement therewith to prevent release of the dispenser from the mounting plate.

Embodiments of the invention will now be described, by way of example only, with reference to the accompanying drawings, in which:

FIG. 1 is a perspective view of a mounting and locking device for a dispenser according to one embodiment of the invention;

FIGS. 2, 3 and 4 are top, front and underneath elevations of the device shown in FIG. 1;

FIG. 5 is a side view showing the device in association with a dispenser;

Figure 7:
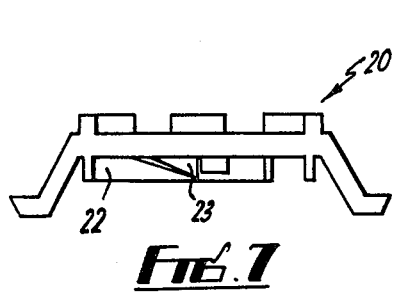
FIGS. 7, 8 and 9 are plan, front and side views of a mounting plate forming part of the device shown in FIG. 6.

Referring to FIGS. 1 to 5, there is shown a mounting and locking device comprising a mounting plate or bracket 5 having a main body portion 6 provided with three apertures 7 to receive screws or like fastening means enabling the bracket to be mounted on a suitable support. A pair of forwardly displaced side members 8 are formed integrally with the body portion 6 and are adapted for sliding engagement with slots (not shown) formed in the back wall of the body of a dispenser to be mounted on the bracket and indicated at 13 in FIG. 5. The peripheral shape of the mounting bracket viewed in front or rear elevation corresponds to the shape of the lower portion 13A of the dispenser body such that when the dispenser is located on the bracket the bracket is hidden from view.

A latch member in the form of a flexible projection 14 is provided on the body portion 6 of the bracket and normally projects therefrom to an extent such that it projects beyond a lower rim 15 formed on the body portion of the bracket and engages in a recess formed in the back wall of the dispenser when the latter is mounted on the bracket as shown in FIG. 5. Due to the resilient nature of the projection 14 it is deflected towards the body protion of the bracket when the dispenser is slidably engaged with the side members 8 but springs out to the position shown in FIG. 5 when the dispenser is in its fully engaged position. In this position the latch member projects into a recess in the rear wall of the dispenser and prevents upward movement of the dispenser by abutment with the inner surface of the bottom wall of the dispenser.

In order to enable the dispenser to be removed from the mounting bracket an opening 16 is provided in the rim 15 through which a suitable tool may be inserted to engage with the resilient projection 14 and urge it towards the body portion 6 of the bracket, thereby enabling the dispenser to be slid upwardly and detached from the bracket. A groove 17 is provided in the underside of the resilient latch member 14 to facilitate engagement by the tool when required.

Figure 6:
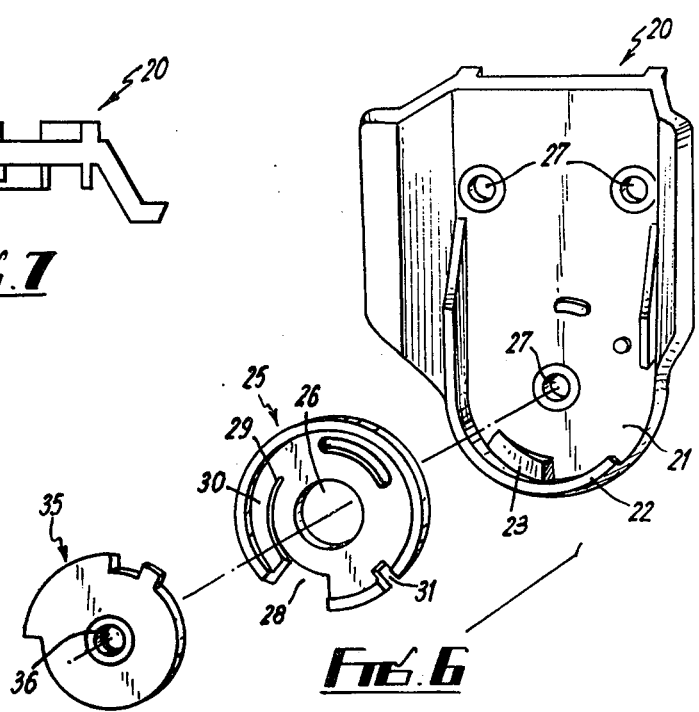
FIG. 6 is an exploded perspective view of an alternative form of mounting and locking device.
Figure 8:
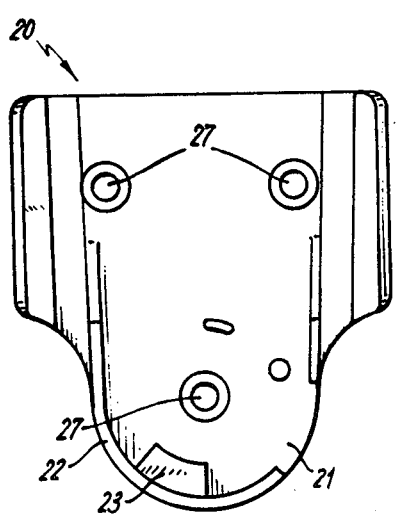
Figure 9:
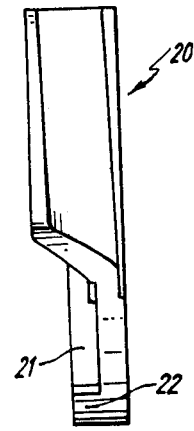
Figure 10:
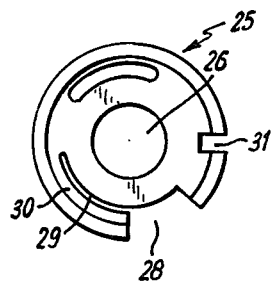
FIGS. 10, 11 and 12 are front, side and rear views of a locking disc forming part of the device shown in FIG. 6.
Figure 11:
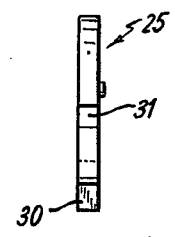
Figure 12:
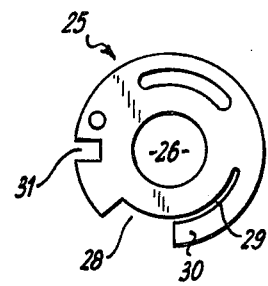
Figure 13:
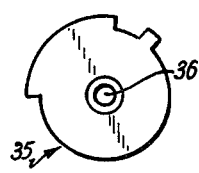
FIGS. 13, 14 and 15 are front, side and rear views of a cover plate and pivot forming part of the device shown in FIG. 6.
Figure 14:
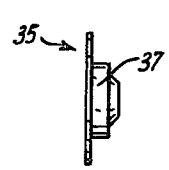
Figure 15:
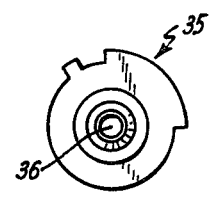
Figure 16:
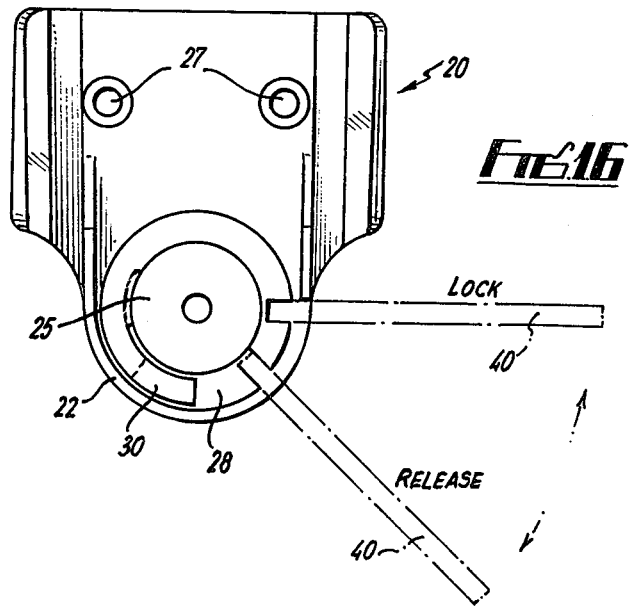
FIG. 16 is a front view of the device with the parts in their assembled condition.
Figure 17:
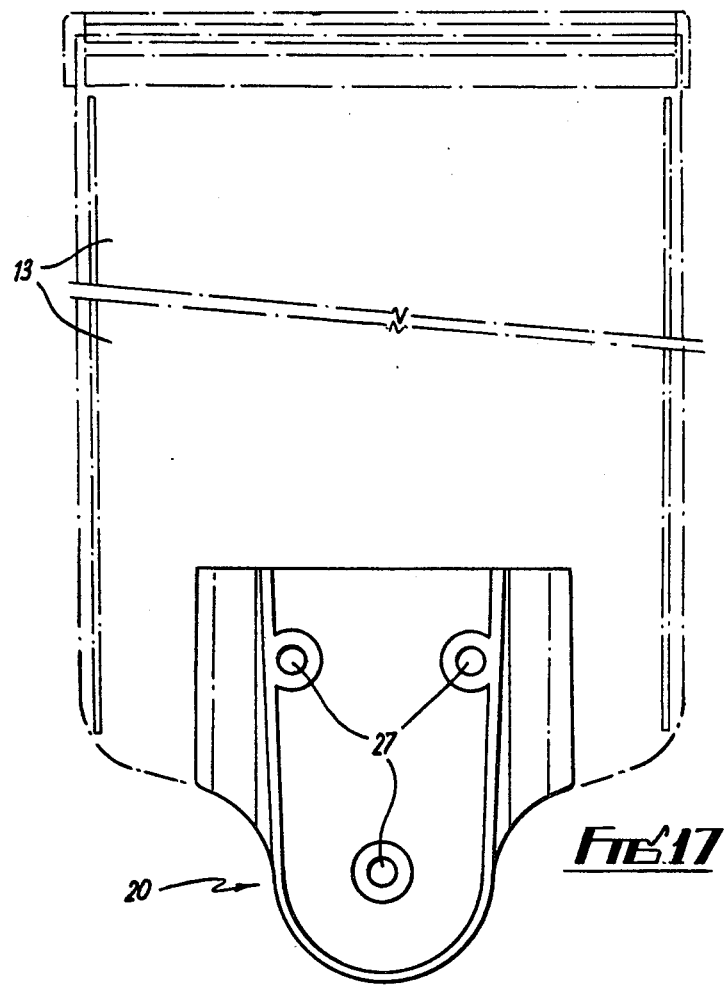
FIGS. 17 and 18 are rear and underneath views of the device shown in association with a dispenser.
Figure 18:
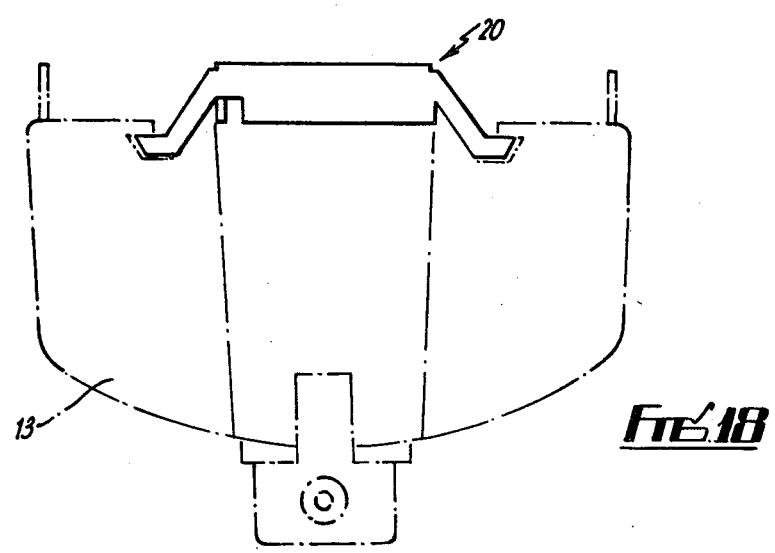

Referring now to the embodiment shown in FIGS. 6 to 18, this incorporates a mounting bracket 20 similar to that shown in FIGS. 1 to 5 but the opening 16 is replaced by a cutaway portion 21 displaced to one side of the lower rim 22. The flexible projection is omitted and a fixed ramp 23 is provided adjacent the bottom of the bracket.

A rotatable locking member in the form of a disc 25 is provided for use in association with the mounting bracket 20 and incorporates a central opening 26 by means of which the disc may be mounted in a position co-axial with the bottom one of the three fixing holes 27 on the bracket. A portion of the periphery of the disc is cut away to form an opening 28 and an arcuate cut 29 extends from the opening 28 to form a flexible tongue 30 at the periphery of the disc. A notch 31 is also formed in the periphery of the disc in a position circumferentially displaced from the tongue 30. A cover plate and pivot member 35 is also provided having a central aperture 36 through which a screw or similar fastening means may be passed, and a boss 37 (FIG. 14) at the rear of the aperture to support the locking disc 25.

In use the bracket 20 is mounted on a wall or other suitable support by screws inserted through the three apertures 27, the lower screw also securing the locking disc 25 and cover plate 35 in position. The locking disc 25 may then be rotated by insertion of a suitable tool indicated at 40 in FIG. 16 through the opening 21 into engagement with the notch 31 in the locking disc. When the flexible tongue 30 is clear of the ramp 23 the tongue is disposed within the rim 22 and does not interfere with sliding movement of the dispenser 13 (FIGS. 17 and 18) on to or off the bracket. However when the locking disc 25 is rotated to bring the tongue 30 into contact with the ramp 23, the tongue rides over the ramp and is deflected outwardly beyond the rim 22 into a position in which it projects into the recessed back of the dispenser to prevent its withdrawal from the bracket.

Thus to fit the dispenser the locking disc 25 is rotated such that the tongue 30 is clear of the ramp 23 on the bracket and the dispenser may then be slid downwards into position on the bracket. Once the dispenser is in position the tool 40 is inserted through the opening 21 into engagement with the notch 31 in the locking disc and the latter is rotated to cause the tongue 30 to ride up over the ramp 23 and project beyond the lip 22 and across the lower edge of the dispenser. The dispenser cannot then be withdrawn upwardly clear of the mounting bracket until the tool 40 is again inserted and the locking disc rotated in the opposite direction to move the tongue 30 clear of the ramp 23.

It will be appreciated that both the embodiments described are of relatively simple construction but provide a locking arrangement which is positive and completely concealed from view so that the dispenser may only be released by use of the appropriate tools.

Various modifications may be made without departing from the invention. For example the locking means may be differently constructed provided it incorporates a locking member movable between positions in which it interferes with and is clear of the body of the dispenser and which is concealed from view and accessible only through an opening using an appropriate tool.

We claim:

1. A mounting and locking device for a dispenser, comprising:

a mounting plate adapted to be fixed to a support,
   mounting means carried by the mounting plate for engaging a dispenser so as to attach the dispenser to the mounting plate, the mounting means being linearly elongated in one direction and the dispenser being moved linearly in that direction with respect to the mounting means when attaching the dispenser to the mounting plate, a latch projecting from the mounting plate into the path of linear movement of a part of the dispenser, the latch being resiliently moveable in a direction transverse to the plane of the mounting plate into and out of said path of movement, and being so formed that it permits the dispenser part to pass it when the dispenser is being moved in the direction for attaching the dispenser to the mounting plate and prevents removal of the dispenser from the mounting plate by movement of the dispenser in the opposite direction, and the latch being carried by the mounting plate at a location which is hidden when the dispenser is attached to the mounting plate, means carried by the latch for engagement by a tool for moving the latch resiliently out of the path of movement of the dispenser part, to permit linear movement of the dispenser with respect to the mounting plate, in a direction opposite to the direction in which the dispenser is moved when attaching it to the mounting plate, so as to remove the dispenser from the mounting plate, a peripheral rim on the mounting plate, said latch member projecting beyond the rim in its locking position, and an opening in the peripheral rim for providing access for a tool to the means carried by the latch for moving the latch, the opening being diemensioned to restrict access other than by use of a tool.

2. A device according to claim 1 wherein said mounting plate is provided with abutment means to limit downward sliding movement of said dispenser and in its locking position said latch member prevents upward movement of the dispenser by abutment with the inner surface of a bottom well of the dispenser.

3. A device according to claim 1 wherein said mounting means comprises a pair of forwardly and laterally projecting side members adapted for sliding engagement with slots formed in a back wall of the dispenser.

4. A device according to claim 1 wherein the peripheral shape of said mounting plate when viewed in front or rear elevation corresponds to the peripheral shape of the portion of the dispenser which overlies the mounting plate when the dispenser is mounted thereon such that the mounting plate is hidden from view.

5. A dispenser assembly comprising a mounting and locking device according to claim 1, and a dispenser incorporating a container adapted to receive products to be dispensed, the dispenser being provided with formations in the rear wall thereof slidably engageable with complimentary formations on the mounting plate to locate the dispenser thereon in a manner such that the mounting plate is obscured by the dispenser, an opening being provided in the dispenser adjacent to said latch member for engagement therewith to prevent release of the dispenser from the mounting plate.

* * * * *